UNITED STATES PATENT OFFICE.

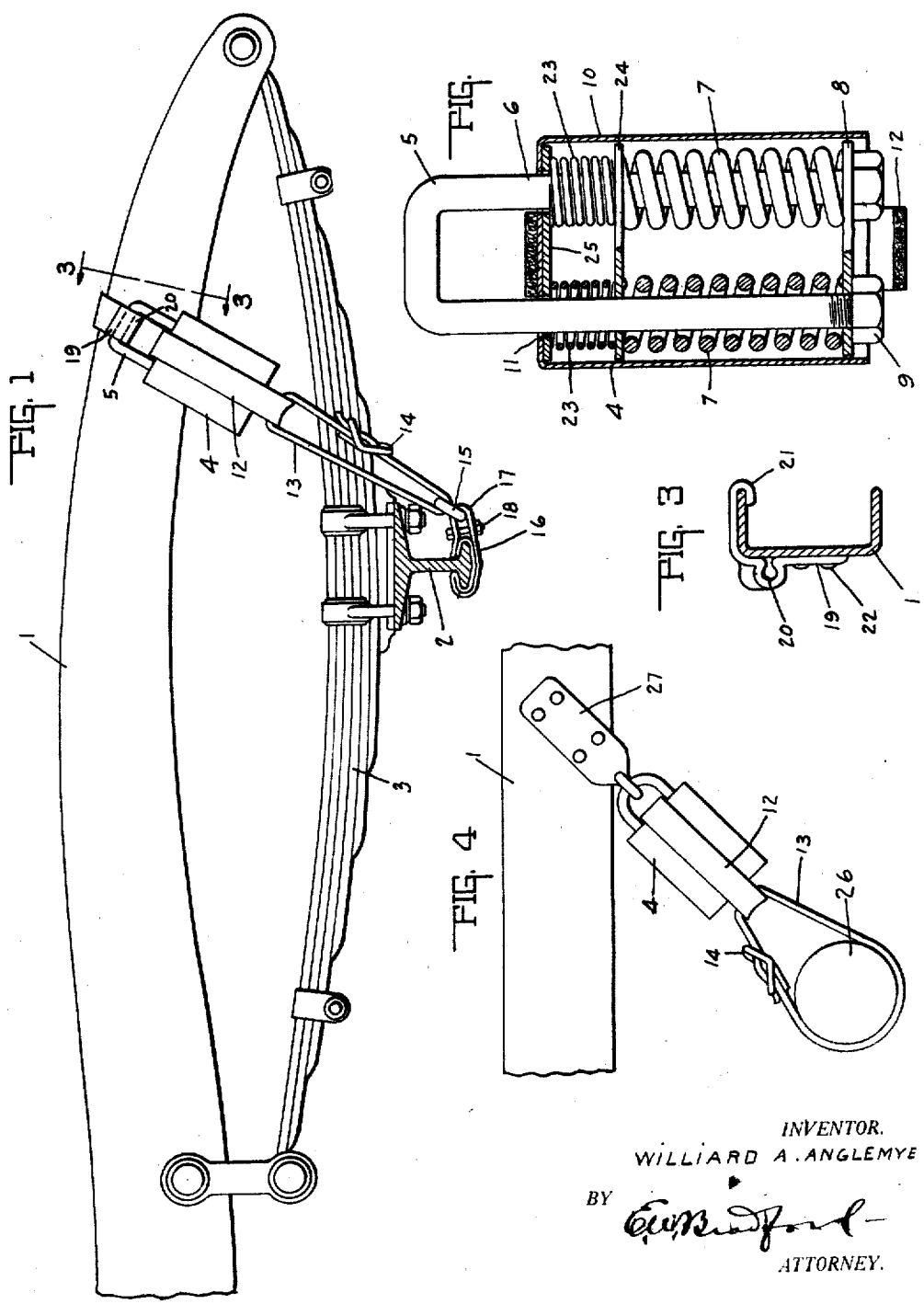

WILLIARD A. ANGLEMYER, OF INDIANAPOLIS, INDIANA.

SHOCK SNUBBER.

1,405,813.

Specification of Letters Patent.     Patented Feb. 7, 1922.

Application filed October 20, 1920. Serial No. 418,229.

*To all whom it may concern:*

Be it known that I, WILLIARD A. ANGLE-MYER, a citizen of the United States, residing at Indianapolis, in the county of Marion and State of Indiana, have invented certain new and useful Improvements in Shock Snubbers, of which the following is a specification.

This invention relates to shock snubbers and is designed primarily for use in connection with automobiles and other vehicles, the prime feature of the invention being the provision of spring members arranged in a housing and connected between the axle and frame of the vehicle so as to absorb any excess rebound or movement of the frame of the vehicle, the housing for the springs being so constructed that it carries the compressing of the springs.

A further feature of the invention is the provision of a clevis like structure which extends through the springs and housing and is connected at its upper end for suspending the snubber from the frame of the vehicle.

A further feature of the invention is the provision of means for flexibly connecting the housing with the axle, means being provided for taking up the slack in the flexible connecting means.

A further feature of the invention is the provision of brackets for connecting the snubber to the frame of the vehicle and also to the axles of the vehicle.

Other objects and advantages will be hereinafter more fully set forth and pointed out in the accompanying specification.

In the accompanying drawings which are made a part of this application,

Figure 1 is a side elevation of the front end of a vehicle frame showing the front spring in connection therewith and the snubber applied to use, Figure 2 is a vertical transverse sectional view through the snubber on an enlarged scale, Figure 3 is a detail sectional view through the frame of the vehicle showing the bracket suspending the snubber therefrom, and Figure 4 is a detail elevation showing the manner of attaching the snubber to the rear axle of a vehicle.

Referring to the drawings in which similar reference numerals designate corresponding parts throughout the several views, 1 indicates a frame, such as is commonly used in connection with automobiles, 2 the forward axle of the automobile, and 3 a spring connecting the frame with the axle. In mounting the frame of the vehicle on the axle through the medium of the spring 3, said frame and parts carried thereby are subject to rebound which results in a shock to the occupants of the vehicle, and in order to practically eliminate these shocks a snubber construction 4 is provided which comprises a substantially U-shaped member 5, the depending shanks 6 of which are adapted to receive coiled springs 7, said springs being retained in position on said shanks by means of a plate 8 which extends from one shank to the other and through which the shanks extend, nuts 9 being threaded onto the lower ends of the shanks for holding the plate in position thereon.

The springs 7 and parts of the shanks 6 are surrounded by a housing 10, the upper end 11 thereof being closed while the lower end is open, consequently the housing 10 will serve to compress the springs 7 when a strain or upward pull is directed against the U-shaped member 5. Surrounding the housing 10 and preferably passing between the shanks 6 at the upper end of the housing is a loop 12, preferably of leather or similar substance, and through the lower end of said loop extends a strap 13, also preferably constructed of leather, said strap preferably having a buckle 14 for securing the ends of the strap together. The lower end of the strap 13 passes through a ring 15, which ring is connected with a bracket 16 employed for securing the snubber to the forward axle 2 of the vehicle, and as said axle is preferably substantially in the form of an I-beam the bracket 16 has parts thereof bent around the lower portion of the I-beam and over hanging the upper edges thereof. This form of bracket is preferably constructed by bending a flat piece of metal upon itself and then bending the ends of these overlapped portions around the parts of the I-beam, one section of the bracket being extended beyond the I-beam to form a socket 17 through which the ring 15 extends, the ring being held in the socket by extending a bolt or pin 18 through the parts of the metal forming the socket and between the ring and the edge of the axle.

The connected end of the U-shaped member 5 is suspended from a bracket 19 which connects with the frame member 1, said bracket 19 also being preferably constructed of a flat strip of metal which is bent to form an eye 20 through which the horizontal portion of the U-shaped member 5 extends, one arm of the bracket extending over the top of the frame bar 1 and having a hook 21 which interlocks with the edge of the frame member 1 while the opposite arm of the bracket extends downwardly along the outer face of the member 1 and is attached thereto in any suitable manner, as by rivets or the like.

When weight is applied to the frame 1 there is more or less slack formed in the strap 13 owing to the yielding nature of the springs 3, and in order to take up this slack and keep the strap normally taut so that any shock incident to the sudden movement of the frame 1 will be instantly taken up by the snubber, a pair of coiled springs 23 are placed around the shanks 6 above the upper ends of the coil springs 7, a plate 24 separating said springs, and if desired a plate 25 may be placed above the springs 23. The tensions of the springs 23 are such that they will move the housing 10 upwardly to take up any slack that may occur in the strap 13, but as these springs are of lighter material than the springs 7, they will not act in any pronounced extent as shock absorbers. However, they will assume some portion of the shock and would possibly serve to take up and assimilate any slight shock that might occur through rebound of the frame 1.

In applying the shock snubber to the rear axle of the vehicle the bracket 16 and parts connecting the strap to the forward axle of the vehicle is dispensed with and the strap placed directly around the rear axle 26, as shown in Figure 4 of the drawings, and in this view a different form of bracket 27 is employed for attaching the snubber to the frame 1, although it will be clearly understood that the same form of bracket may be used as shown in the other views. Although it is preferred to suspend the snubber in proximity to the face of the frame 1, yet where space permits the snubber may be positioned in a plane below the frame 1, or in fact may be positioned at any suitable point between the bracket on the part 1 and the axle. The snubbers 4 and the parts employed for securing them on the frame 1 and the vehicle axles are preferably disposed at an angle to a vertical line through the axles so that said snubbers will act to retard or eliminate longitudinal swinging movement of the body of the vehicle above the axles, and if desired one snubber may be arranged to exert action in opposition to the other snubber.

Under ordinary circumstances the snubbers float between the frame of the vehicle and the axle thereof, and as the frame 1 descends under weight, or otherwise the springs 23 act to take up slack in the straps 13, and in case of a very slight rebound of the frame 1 it will be taken up by said springs 23. In case of an extreme rebound, however, the springs 23 will entirely close when tension will be directed against the stronger spring 7, the strength of said springs being sufficient to practically take up and absorb the shock before it reaches the body of the vehicle, and during such rebound of the frame 1 the strap 13 and loop 12 will hold the housing 10 against upward movement beyond the limits of such loop and strap, consequently the continued upward movement of the frame 1 will draw the shanks of the U-shaped member 5 vertically through the housing and cause the springs surrounding the shanks to compress.

In view of the simplicity of this device it can be very cheaply manufactured and readily applied to use and may be attached to practically all makes of automobiles by constructing suitable brackets for attaching the parts of the snubber to the frame and axle of the vehicle.

Having thus fully described my said invention, what I claim as new and desire to secure by Letters Patent, is:

1. In a shock snubber, a plurality of compression springs, a plurality of shock take-up springs of less strength than the compression springs and in the same axial alignment, a housing surrounding all of said springs, said housing having one of its ends closed, suspending means extending through the closed end of said housing and axially through all of said springs, a partition plate between said compression and take-up springs, means for connecting said suspending means to the frame of a vehicle, a loop connected with said housing, and a strap connecting said loop to the axle of the vehicle whereby when said frame is caused to rebound said housing will cause said springs to compress and absorb the shock incident to said rebound.

2. In a shock snubber, compression springs, a housing surrounding said compression springs and having one of its ends closed, a substantially U-shaped member extending through the closed end of said housing and through said springs, means for retaining the springs on said housing and for causing the springs to compress when the U-shaped member is moved upwardly, means for connecting one end of the U-shaped member to the frame of a vehicle, a loop surrounding said housing, a strap connected with said loop, and means for connecting the strap to the axle of a vehicle whereby when the frame of the vehicle rebounds the U-shaped member will move lengthwise through the housing and compress the springs within the housing.

3. In a shock snubber, a substantially U-shaped member, means for suspending said member from the frame of a vehicle, springs surrounding the shanks of the U-shaped member, a housing surrounding said springs and having a closed end through which the shanks of the U-shaped member extend, a loop surrounding said housing and passing between the shanks of the U-shaped member, a strap for connecting the loop with the axle of the vehicle, and means in said housing between the closed end of the housing and said springs for taking up slack in said strap.

4. In a shock snubber, a substantially U-shaped member having paralleling shanks, shock absorbing springs surrounding said shanks, plates carried by the shanks at opposite ends of said springs, a housing having its upper end closed through which the shanks of the U-shaped member extend, said housing enclosing said springs, means for anchoring the U-shaped member to the frame portion of a vehicle, a loop extending lengthwise of said housing and passing between the shanks of the U-shaped member at the closed end of the housing, a strap passing through said loop at the lower end of the housing and securing the housing to the axle of the vehicle, springs between the closed end of the housing adapted to prevent slack in said strap, and a plate at the upper end of the shock absorbing springs.

In witness whereof, I have hereunto set my hand and seal at Indianapolis, Indiana, this 12th day of October, A. D. nineteen hundred and twenty.

WILLIARD A. ANGLEMYER. [L. S.]

Witnesses:
CAREY S. FRYE,
M. L. SHULER.